United States Patent
Braun et al.

(10) Patent No.: US 9,944,351 B2
(45) Date of Patent: Apr. 17, 2018

(54) DEVICE FOR SHIFTING THE CHAIN ON A FRONT CHAIN WHEEL FOR A BICYCLE

(71) Applicant: SRAM Deutschland GmbH, Schweinfurt (DE)

(72) Inventors: Michael Braun, Dittelbrunn (DE); Marcus Auer, Schwebheim (DE); Markus Engel, Schweinfurt (DE)

(73) Assignee: SRAM, LLC, Chicago, IL (US)

( * ) Notice: Subject to any disclaimer, the term of this patent is extended or adjusted under 35 U.S.C. 154(b) by 159 days.

(21) Appl. No.: 14/632,072

(22) Filed: Feb. 26, 2015

(65) Prior Publication Data

US 2015/0274256 A1    Oct. 1, 2015

(30) Foreign Application Priority Data

Feb. 27, 2014    (DE) .................... 20 2014 001 791 U
Feb. 18, 2015    (DE) ........................ 10 2015 001 909

(51) Int. Cl.
| | | |
|---|---|---|
| *B62M 9/136* | (2010.01) | |
| *B62M 9/131* | (2010.01) | |
| *B62M 9/135* | (2010.01) | |
| *B62M 9/10* | (2006.01) | |

(52) U.S. Cl.
CPC ............ *B62M 9/136* (2013.01); *B62M 9/105* (2013.01); *B62M 9/131* (2013.01); *B62M 9/135* (2013.01)

(58) Field of Classification Search
CPC ...... B62M 9/105; B62M 9/131; B62M 9/134; B62M 9/136; B62M 9/137
See application file for complete search history.

(56) References Cited

U.S. PATENT DOCUMENTS

| | | | |
|---|---|---|---|
| 4,551,121 A | | 11/1985 | Nagano |
| 5,192,248 A | † | 3/1993 | Nagano |
| 5,738,603 A | | 4/1998 | Schmidt |
| 6,007,442 A | † | 12/1999 | Schmidt |
| 6,009,771 A | | 1/2000 | Desenclos |
| 6,572,500 B2 | † | 6/2003 | Tetsuka |
| 2005/0272541 A1 | | 12/2005 | Valle |
| 2006/0058133 A1* | | 3/2006 | Tetsuka ................ B62M 9/1342 474/80 |
| 2008/0032835 A1* | | 2/2008 | Reynolds ............... B62M 9/136 474/80 |

(Continued)

FOREIGN PATENT DOCUMENTS

| | | |
|---|---|---|
| DE | 3411874 A1 | 10/1984 |
| DE | 4445035 C1 | 6/1996 |

(Continued)

OTHER PUBLICATIONS

European Search Report From EP15000495.0 dated Jul. 15, 2015.

*Primary Examiner* — William E Dondero
*Assistant Examiner* — Robert T Reese

(57) ABSTRACT

A shifting assembly for shifting a roller chain between a plurality of front chain wheels for a bicycle that includes a smaller chain wheel, a larger chain wheel and a chain derailleur having a channel on an inner guide plate. The channel has an elevation that comes into contact with a chain rise rivet on the larger chain wheel in the state of starting to shift the roller chain from the smaller chain wheel to the adjacent larger chain wheel, viewed in a direction parallel to the axis of rotation of the chain wheels.

15 Claims, 7 Drawing Sheets

(56) References Cited

U.S. PATENT DOCUMENTS

| | | | |
|---|---|---|---|
| 2008/0182689 A1* | 7/2008 | Fujii | ............... B62M 9/136 474/82 |
| 2013/0085025 A1 | 4/2013 | Inoue | |
| 2014/0349793 A1* | 11/2014 | Emura | ............... B62M 9/137 474/80 |
| 2015/0210352 A1† | 7/2015 | Sugimoto | |

FOREIGN PATENT DOCUMENTS

| | | |
|---|---|---|
| DE | 19706156 A1 | 8/1998 |
| EP | 0474139 | 8/1991 |
| EP | 0474139 A1 | 3/1992 |
| EP | 3411874 A1 | 3/1992 |
| EP | 0538780 | 4/1993 |
| EP | 0538780 A1 | 4/1993 |
| EP | 1602572 | 12/2005 |
| EP | 1609713 | 12/2005 |
| EP | 1609713 A2 | 12/2005 |
| EP | 16020572 A1 | 12/2005 |
| EP | 2353989 A1 | 8/2011 |
| EP | 2574540 A1 | 4/2013 |
| JP | 3290688 B2 † | 10/1993 |
| JP | H06-305475 A | 1/1994 |
| JP | 3290688 B2 | 6/2002 |
| WO | WO2010/073099 A1 | 7/2010 |

\* cited by examiner
† cited by third party

DEVICE FOR SHIFTING THE CHAIN ON A FRONT CHAIN WHEEL FOR A BICYCLE

The present invention relates to a device for shifting the roller chain on a front chain wheel for a bicycle, comprising a smaller chain wheel, a larger chain wheel, a roller chain, and a chain derailleur having a channel on an inner guide plate, for guiding the roller chain during chain shifting.

The front chain derailleur of a bicycle conveys the chain from one of the graduated front chain wheels to an adjacent other chain wheel, for the purpose of shifting gears. This shifting procedure is initiated by a shifting movement of the chain guide element that runs transverse to the chain running direction. The shifting procedure can take place in both directions, from a large or medium chain wheel to the next smaller one, and from a small or medium chain wheel to the next larger one. In this connection, the chain runs between a frame-side inner guide plate and an outer guide plate of the chain guide element, and is conveyed to the adjacent chain wheel, in accordance with the desired shifting direction, either by the inner or outer guide plate. These guide plates have a contour adapted to the respective shifting procedures on the side directed toward the chain.

There are front chain derailleurs both for double chain wheel arrangements and for triple chain wheel arrangements, with a corresponding configuration of the respective chain guide element that interacts with the chain and is not allowed to collide with the chain wheels and the crank.

During the shifting procedure, the chain slides along the guide surface as it moves from a larger to a smaller chain wheel and in the opposite direction, and is shifted to an adjacent chain wheel by this surface. At the beginning of this shifting procedure, the respective guide plate exerts a force on the chain and guides it to the adjacent chain wheel. Because the working run of the chain that is under the effect of a chain tension force is involved, which run is deflected, the guide plates must be configured to be correspondingly stable. The connection elements present between the guide plates, in the form of an upper spacer crosspiece, a rear spacer crosspiece, and a front plate connection, increase the stability of the guide plates.

The invention is directed not only at the configuration of the inner guide plate but also at the front chain wheels on the crank, which interact with the inner guide plate. Better conditions are supposed to be achieved when shifting the roller chain from a smaller chain wheel to an adjacent, larger chain wheel.

This shifting procedure is generally made more difficult in that the section of the roller chain that participates in shifting represents the working run of the roller chain drive, with which tension forces are transferred between a front chain wheel and a rear sprocket on the rear wheel. Under the effect of these tension forces, the roller chain has the tendency to assume a straight-line progression. In contrast to this, the shifting procedure requires that the roller chain can come into engagement with the teeth on the chain wheel to which the chain is to be shifted, and for this purpose must have a bent progression.

Different solution approaches have been pursued for implementing a procedure for shifting the chain. In EP 0 474 139, a hook-shaped part on the chain wheel to which the roller chain is to be shifted engages between a pair of chain link plates and conveys the chain to a larger radial level. In this connection, a compromise must be found to the effect that the hook-shaped part should project away from the chain wheel as far as possible in the axial direction, in order to securely engage between a pair of chain link plates, while on the other hand, a hook-shaped part that projects too far can come into contact with the roller chain, which runs toward the chain wheel at a slant, thereby causing disruptive noise and also causing wear of the hook-shaped part. From EP 0 538 780, a solution is known in which two chain rise rivets come into contact with the roller chain, one after the other, during the shifting procedure, in doing so bring the corresponding chain links to a higher radial level, and prepare for direct engagement between a tooth on the larger chain wheel and a link of the roller chain. Because the chain bends slightly at the first chain rise rivet during this shifting procedure, it assumes a bent progression, thereby causing the total length of the chain links involved to be greater than the direct straight-line distance to the tooth on the larger chain wheel that comes into engagement with the roller chain. In this way, it can be prevented that a non-secure engagement procedure between a pair of inner link plates of the roller chain and the tooth of the gear wheel takes place, and afterward the chain nevertheless comes out of engagement again, which would mean greater stress on the roller chain. Instead, the result is achieved that engagement of a pair of outer link plates of the roller chain with the tooth of the chain wheel always takes place, and engagement of a pair of inner link plates of the roller chain with the tooth of the chain wheel is reliably prevented.

From EP 1 609 713, shifting support projections are known, which selectively engage only on outer link plates, while they allow chain links having inner link plates to pass by without coming into contact with them.

The invention has set itself the task of making do with few means for chain shifting and nevertheless implementing a reliable procedure for chain shifting. For this purpose, the inner guide plate of the chain guide element is structured accordingly and equipped, on the side facing toward the outer guide plate, with a channel for accommodating the roller chain that moves relative to the chain guide element, as is already known from U.S. Pat. No. 4,551,121 and EP 1 602 572.

In addition, the channel has an elevation along its longitudinal expanse, which elevation reduces the vertical distance between the two guide plates, forming a constriction. The position of the elevation is coordinated to ensure that the elevation meets a rise rivet disposed on the larger chain wheel during the advancing rotational movement of the chain wheel. Viewed in a direction parallel to the axis of rotation of the chain wheels, the rise rivet, a roller chain link, and the elevation come into coverage at the time point when the rise rivet starts to come into engagement between outer link plates of the roller chain. The rise rivet conveys the roller chain to a greater radial level and contributes to secure engagement of the roller chain on a tooth of the larger chain wheel that follows in the direction of the expanse of the roller chain.

The geometrical conditions are thereupon coordinated so that in the assembled state of chain derailleur, chain wheel, and roller chain, the distance between the elevation on the chain guide element and a tooth on the smaller chain wheel corresponds to a whole-number multiple of the chain pitch in the vicinity of the roller chain leaving the smaller chain wheel tangentially, at the time when chain shifting starts.

In a further development of the invention, a selection rib is additionally disposed on the larger chain wheel, which rib interacts with the links of the roller chain.

When an inner link plate link lies against the selection rib, the selection rib gets between the ends of outer link plates that are adjacent in the expanse direction of the roller chain.

Then the chain can maximally approach the adjacent larger chain wheel, and engagement of the roller chain on the chain rise rivet comes about.

In the alternative constellation, an outer link plate of the chain rides up on the selection rib and prevents maximal approach of the roller chain to the adjacent larger chain wheel. Consequently, the result comes about that the elevation cannot press an inner link plate far enough in the axial direction, all the way to the rise rivet, so that this inner link plate link comes into contact with the rise rivet. On the other hand, in the opposite constellation, engagement of the roller chain on the chain rise rivet is prevented even more securely than without the presence of a selection rib.

The preferred exemplary embodiment of the invention will be explained below, on the basis of representations in figures.

FIG. 1 shows a perspective view of a chain guide element according to the invention for a front chain derailleur of a bicycle.

In FIG. 2, the chain guide element from FIG. 1 is shown, with a viewing direction from the outer guide plate to the inner guide plate.

In FIG. 3, the chain guide element from FIG. 1 is shown, with a viewing direction from the front plate connection to the upper spacer crosspiece.

Figure 1:
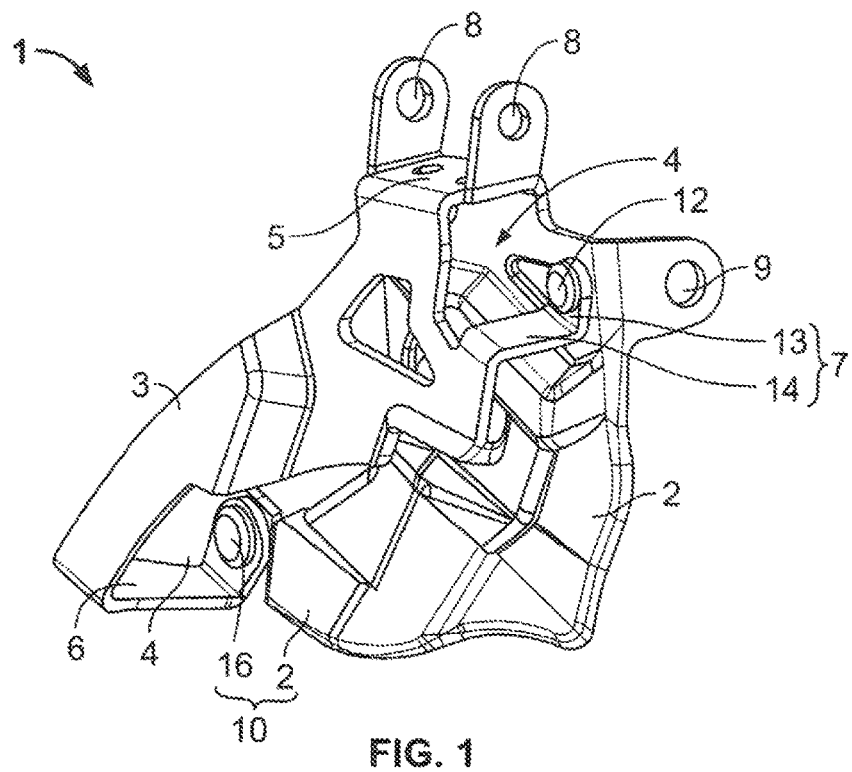
Figure 2:
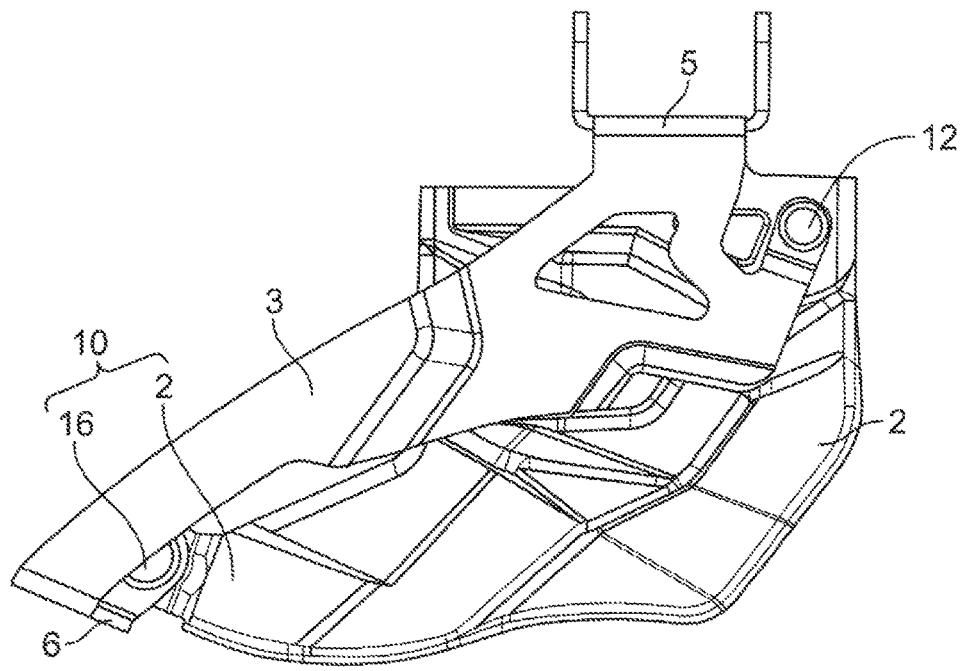
Figure 3:
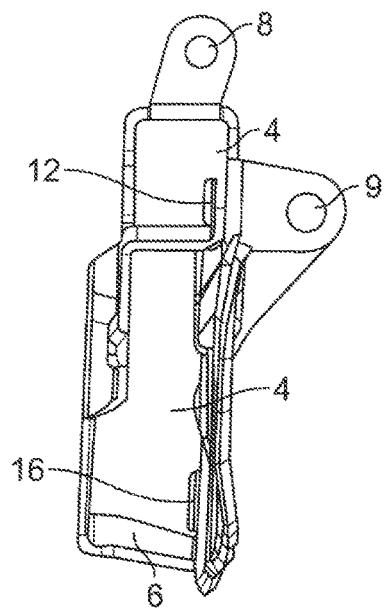

In FIGS. 1 to 3, a chain guide element (1) for a front chain derailleur of a bicycle is shown in different views. An inner chain guide plate (2), an outer chain guide plate (3), as well as an interstice (4) formed between these can be seen. A roller chain, not shown, which forms a closed ring in the assembled state on the bicycle, runs through the interstice (4).

A first pin hole (8) and a second pin hole (9) each serve for accommodating the swivel pins not shown in these figures, which form a rotational joint between arms of a parallelogram mechanism usually disposed on the chain guide element (1) and the chain guide element (1), so that the chain guide element (1) can be moved relative to the bicycle frame and thereby also relative to the chain wheels on the crank bearing. This relative movement of the chain guide element (1) serves for shifting the chain from one chain wheel to the adjacent chain wheel.

Figure 6:
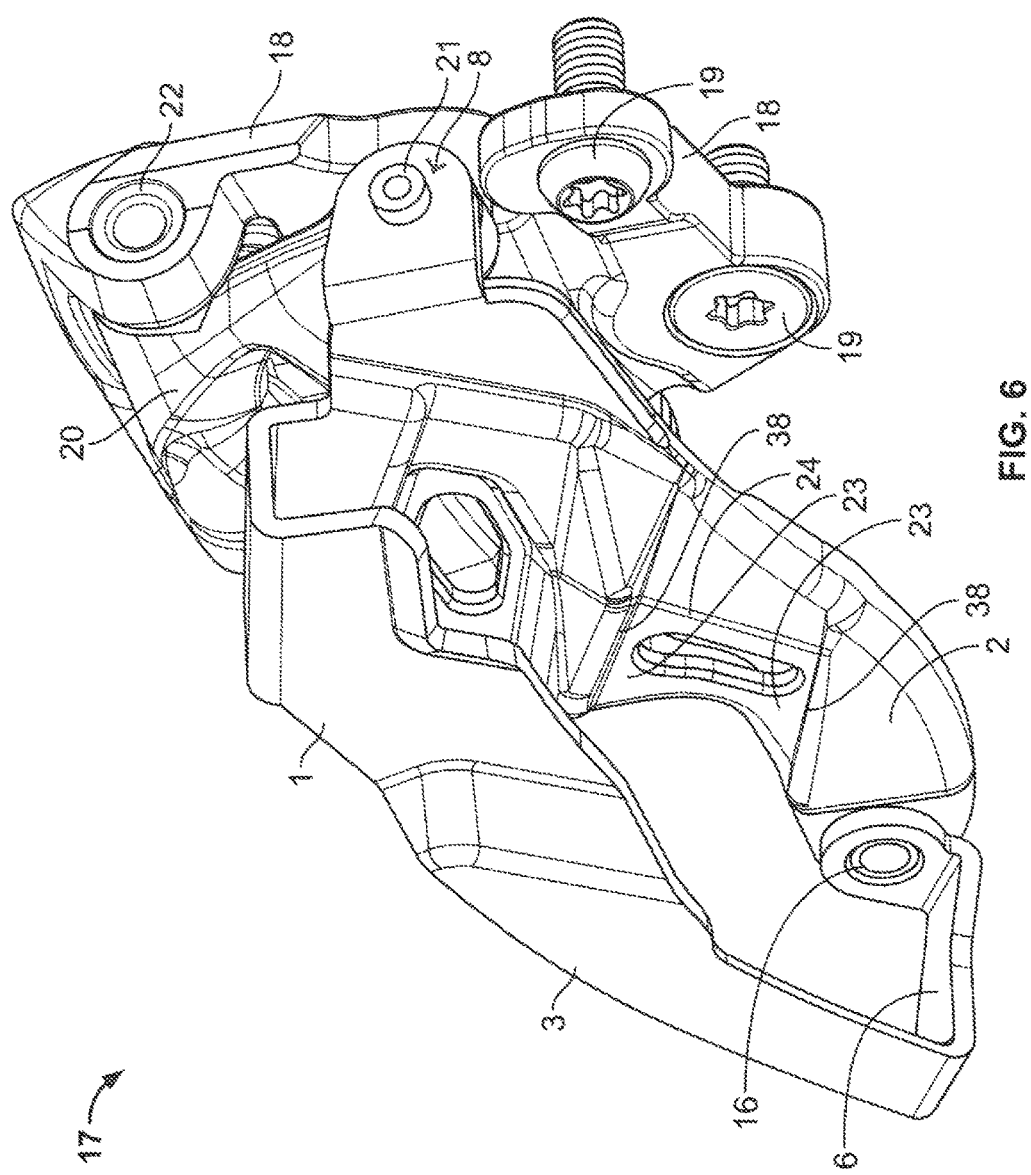
FIG. 6 shows a chain derailleur of the device according to the invention for shifting the roller chain on a front chain wheel for a bicycle, in a perspective representation, viewed at a slant from the front.

A complete chain derailleur (17) is shown in FIG. 6 in a perspective representation. This is an embodiment of a chain derailleur in which a base part (18) is connected with the seat tube of the bicycle frame, not shown, by means of attachment screws (19). Alternative designs of chain derailleurs have a cable clamp that is connected with the base part and serves for installation on the seat tube of the bicycle frame.

The chain guide element (1) is movably connected with the base part (18) by means of an arm (20) that belongs to the parallelogram mechanism as well as a tension arm (35). A cable clamping screw (36) is disposed on the covered and therefore not visible tension arm (35).

Both the arm (20) and the tension arm (35) are movably connected with the base part (18) by means of hinge pins (22), and with the chain guide element (1) by means of swivel pins (21). The first pin holes (8) and the second pin holes (9), not shown, for accommodating the swivel pins (21) are disposed not above the chain guide element (1) as in the embodiment according to FIGS. 1 to 5, but rather to the side of the chain guide element (1).

The spatial arrangement of the chain guide element (1) can fundamentally be above or below the base part (18), with the expanse of the arm (20) and the tension arm (35) upward or downward, respectively, proceeding from the base part (18). In the embodiment according to FIG. 6, the arm (20) extends downward, proceeding from the base part (18).

The inner chain guide plate (2) and the outer chain guide plate (3) are configured in such a manner that they do not collide with the chain wheels during the shifting movement.

In FIGS. 1 to 3, further detail characteristics of the chain guide element (1) can be seen. An upper spacer crosspiece (5) and a rear spacer crosspiece (6) produce a required mechanical connection between the inner chain guide plate (2) and the outer chain guide plate (3), the rear spacer crosspiece (6) furthermore preventing the chain from slipping out of the interstice (4). The rear crosspiece attachment (10) between the rear spacer crosspiece (6) and the inner chain guide plate (2) is formed with the involvement of a crosspiece rivet (16). Alternatively, for the purpose of insertion of a chain present as a closed ring, the rear crosspiece attachment (10) is formed between the rear spacer crosspiece (6) and the inner chain guide plate (2), using a screw.

A front plate connection (7) produces a further connection between the inner chain guide plate (2) and the outer chain guide plate (3). In this regard, a spacer piece (14) extends between the inner chain guide plate (2) and the outer chain guide plate (3), and a connection tab (13) lies on the inner chain guide plate (2). A rivet (12) connects the connection tab (13) and the inner chain guide plate (2) in non-releasable manner, and stabilizes the chain guide plates (2, 3) relative to one another. Multiple effects result from the selected Z-shaped arrangement of the outer chain guide plate (3), spacer piece (14), and connection tab (13), as can be seen in FIGS. 1 and 3.

The rivet (12) is easily accessible for tools that must be used for riveting. Furthermore, the outer chain guide plate (3) has greater stability with regard to bending relative to the inner chain guide plate (2) than an arrangement of another front plate connection (7) that has a U shape and engages around the edge of the inner chain guide plate (2). This is evident from the greater distance between the upper spacer crosspiece (5) and the front plate connection (7) in the chain guide element (1) according to the invention.

Figure 4:
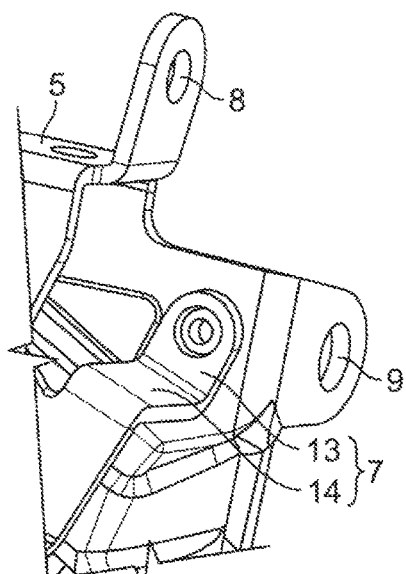
FIG. 4 shows details of the chain guide element from FIG. 1 in the region of the front plate connection, without a rivet.
Figure 5:
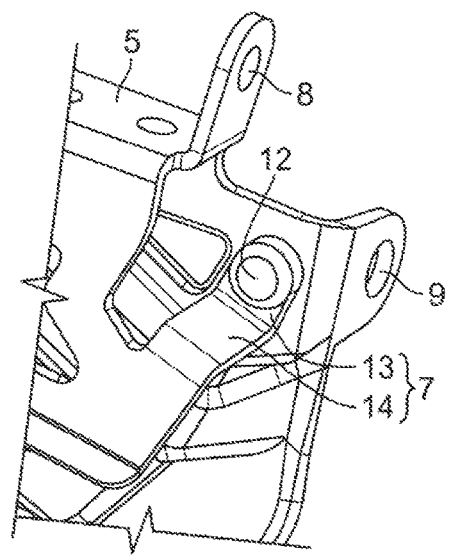
FIG. 5 shows details of the chain guide element from FIG. 1 in the region of the front plate connection, with a rivet.

The spacer piece (14), as can be seen in the detail views of FIGS. 4 and 5, can also be used as a delimitation element to prevent the chain from being lifted too far during the shifting procedure, in the embodiment according to the invention, when the chain rises radially outward beyond the teeth on the largest chain wheel during the shifting procedure. In order for the chain to be guided but not clamped between teeth on the chain wheel and the front plate connection (7), the spacer piece (14) is inclined downward along its expanse, in the direction from the upper spacer crosspiece (5) to the front plate connection (7).

The rivet (12) shown in FIG. 5 is produced from solid material. Instead, a hollow rivet can also be used.

In place of the rivet (12), a screw can also be used, for example if special requirements exist with regard to accessibility, maintenance possibilities, and replacement of components.

First and second pin holes (8, 9) can be positioned differently, relative to one another, in other embodiments of the invention; this is connected with the direction of the expanse of the arms of the parallelogram mechanism. In the exemplary embodiment shown, the first pin hole (8) is in a higher position than the second pin hole (9). This could also be the opposite, or both pin holes can be disposed at the same height level.

In FIGS. 1 and 2, a section of the inner chain guide plate (2) can be seen above and to the right of the rear spacer crosspiece (6) and the crosspiece rivet (16), above the end of the reference symbol lines to the reference symbol "2" in each instance, which section forms a channel. This channel begins at the upper outer edge of the inner chain guide plate (2), narrows from left to right in the drawing representation, in terms of its course, and ends at a line that runs from bottom left to top right. This line represents an elevation. Because the channel faces the interstice (4) of the chain guide element (1), it can come into contact with the roller chain that extends through the interstice. The channel (23) and the elevation (24) can also be seen in FIG. 6.

Figure 7:
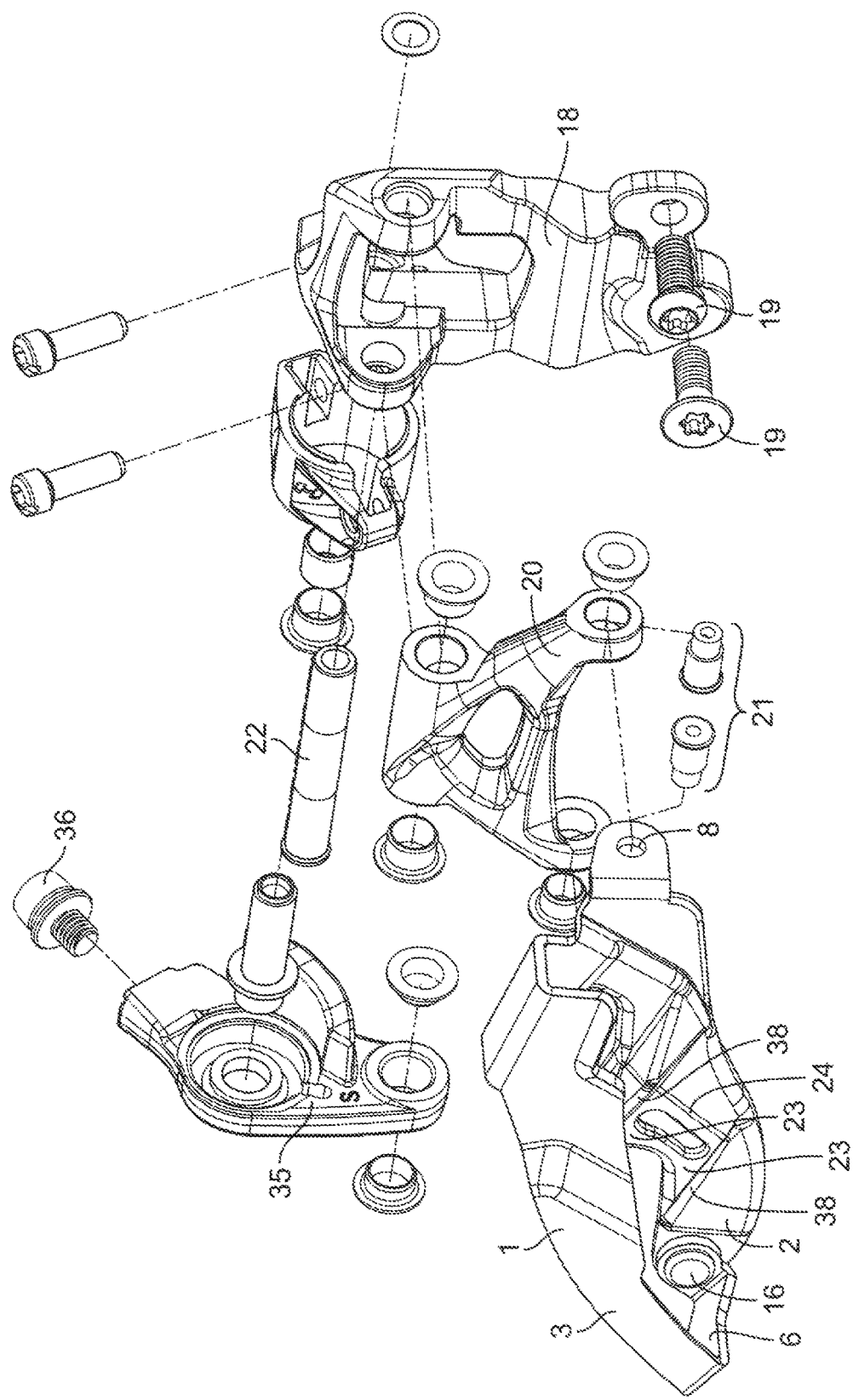
FIG. 7 shows the chain derailleur from FIG. 6 in an exploded representation.

In the exploded representation in FIG. 7, the base part (18), the arm (20), the tension arm (35), the chain guide element (1), the swivel pin (21), and the hinge pin (22) can be seen as the essential elements of the chain derailleur (17). The chain guide element (1) has the channel (23) having the elevation (24).

Figure 8:
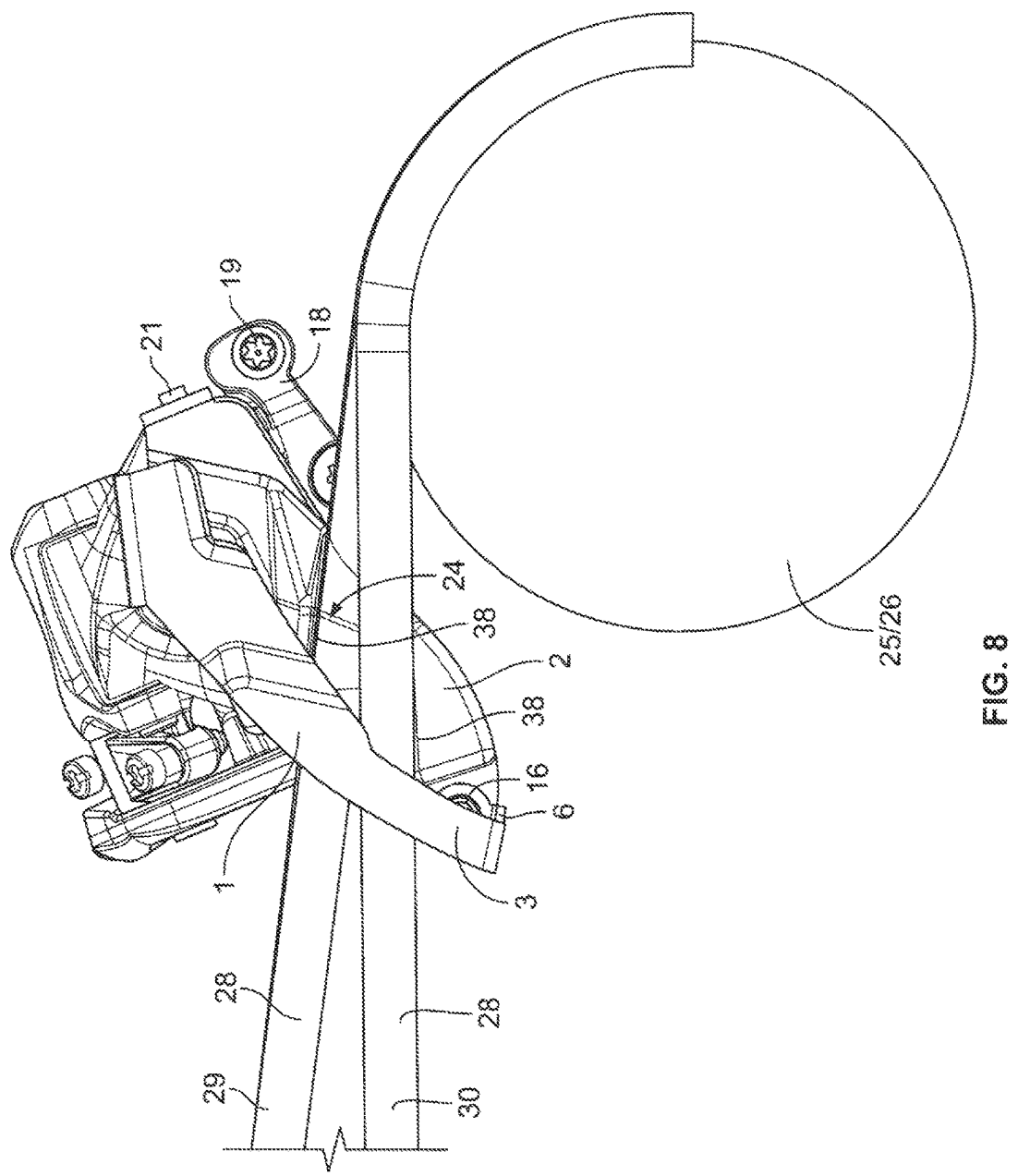
FIG. 8 shows the device, according to the invention, for shifting the roller chain on a front chain wheel for a bicycle, the front chain wheel and the roller chain being shown only schematically.

FIG. 8 shows the device according to the invention for shifting the roller chain (28) on a front chain wheel (25) for a bicycle, viewed parallel to the crank axis, from the right side of the bicycle. The conditions are shown as to how sections of the roller chain (28) form the high working run (29) or, alternatively, the low working run (30). In this connection, the high working run (29) produces the connection between the smaller chain wheel (26) and a largest sprocket, not shown, of the sprocket set on the rear wheel. The low working run (30) furthermore produces the connection between the same smaller chain wheel (26) and a smallest sprocket, also not shown, of the sprocket set on the rear wheel.

The front chain wheel (25) and the roller chain (28) are only shown schematically. The circle that illustrates the front chain wheel (25) is a circle through the axes of the chain pins, not shown, of the roller chain (28), which is in engagement with the chain wheel. The strip that represents the roller chain (28) is a circular envelope curve around the links of the roller chain.

In the representation, the channel (23) on the inner chain guide plate (2) is situated behind the high working run (29) and the low working run (30); the edges (38) of the channel run together in a funnel shape, in the chain running direction, in accordance with the angular position of the high working run (29) and the low working run (30). The elevation (24) runs in a straight line between the edges (38) of the channel. A different progression of the elevation would also be conceivable in another embodiment. The only thing that is important is that the elevation (24) can come into contact with the roller chain (28) when links of the roller chains (28) are situated in the channel (23).

Figure 9:
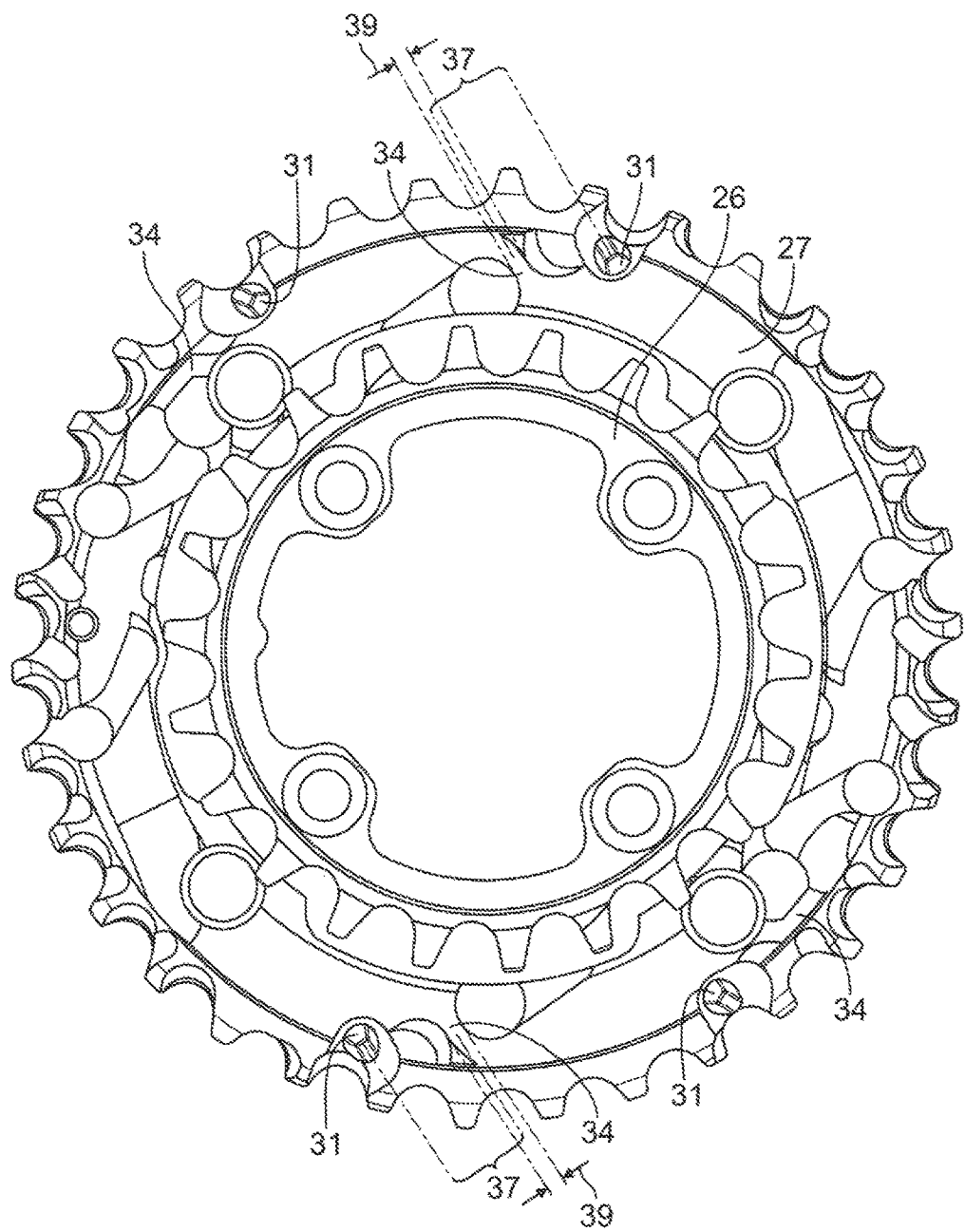
FIG. 9 shows the front chain wheel of the device according to the invention for shifting the roller chain, as well as the adjacent smaller chain wheel, viewed axis-parallel to the axis of rotation of the chain wheels.

FIG. 9 shows the smaller chain wheel (26) of the device according to the invention for shifting the roller chain (28), as well as the adjacent larger chain wheel (27), viewed axis-parallel to the axis of rotation, not shown, of the chain wheels (26, 27), from the left side of the bicycle or from the side of the smaller chain wheel (26). Accordingly, the positions of the chain wheels (26, 27) are their installation position on the crank, but without the required attachment means being shown, as well.

Multiple chain rise rivets (31) are present on the side of the larger chain wheel (27) that faces the smaller chain wheel (26), which rivets are spaced apart from one another in the circumference direction.

Figure 10:
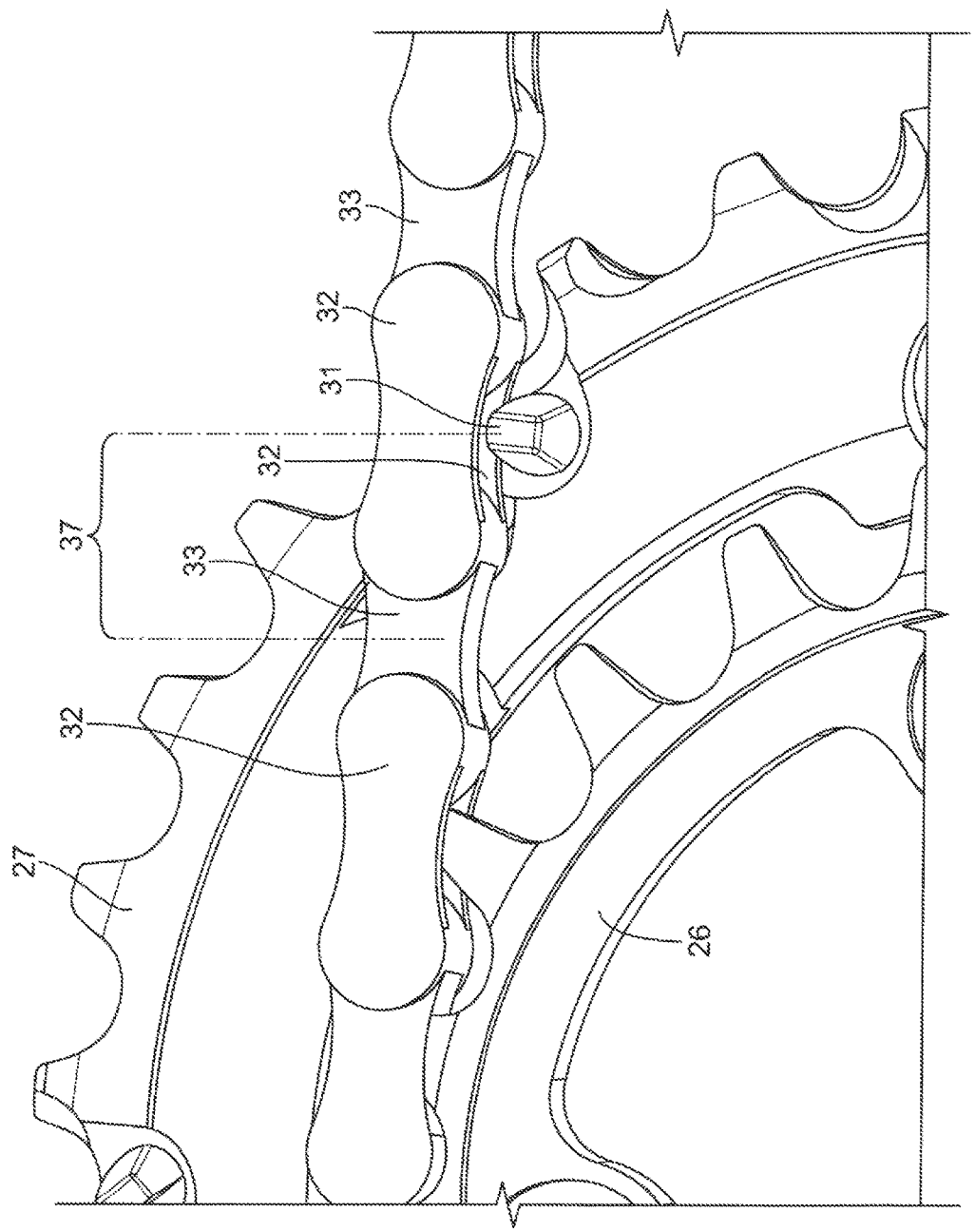
FIG. 10 shows the situation at the point in time when chain shifting begins, in a device according to the invention for shifting the roller chain.

FIG. 10 shows the situation at the point in time when chain shifting starts in a device according to the invention for shifting the roller chain (28), viewed from the side of the smaller chain wheel (26). Because the viewing direction goes slightly upward, the pairs of outer link plates (32) of the outer link plate links of the roller chain (28) can be seen. In the representation of the inner link plate links (33), the details of the inner link plates, which are also disposed in pairs, have been left out.

It can be seen that the hook-shaped end of a chain rise rivet (31) engages into the space between the outer link plates (32), and, during the further joint rotational movement of the chain wheels (26, 27), takes the chain link in question along with it, thereby bringing about bending of the roller chain (28). A basic prerequisite for this engagement is that the distance between a tooth on the tangential run-off of the chain from the smaller chain wheel (26), in the state when shifting of the roller chain (28) to the adjacent larger chain wheel (27) starts, on the one hand, and the chain rise rivet (31), on the other hand, corresponds to a whole-number multiple of the chain pitch (37).

The position of the elevation (24), not shown, in the channel (23) on the inner chain guide plate (2) corresponds, in this connection, to the link plate of the chain that lies against the chain rise rivet (31).

In order to be able to accommodate the links of the roller chain (28) in the channel (23) during shifting of the roller chain (28), the edges (38) of the channel (23) must be disposed outside of a region that is predetermined, on the one hand, by the high working run (29), namely when the roller chain (28) runs from the smaller chain wheel (26) to the largest rear sprocket on the rear wheel, and that is predetermined, on the other hand, by the low working run (30), when the roller chain (28) runs from the smaller chain wheel (26) to the smallest rear sprocket on the rear wheel.

As a result of the preferred positioning of the links of the roller chain (28) during the procedure of chain shifting in the channel (23) of the chain guide element (1), feeding of the roller chain (28) to the chain rise rivet (31) takes place. What is brought about is that a chain rise rivet (31) engages into the space between a pair of outer link plates (32).

By means of the action of the channel (23) having the elevation (24) on the chain guide element (1), links of the roller chain (28) are pressed toward the chain rise rivet (31). This measure is supported by elements for supporting the shifting of the roller chain (28), which elements are provided on the larger chain wheel (27).

In the viewing direction, a selection rib (34) is additionally situated on the larger chain wheel (27) behind the inner link plate link (33) of the roller chain (28), which rib projects into the space between the ends of the outer link plates (32) that lie opposite one another in the chain running direction.

For this purpose, the width (39) of the selection rib (34) must be selected to be correspondingly small. As a result, the roller chain (28) can maximally approach the larger chain wheel (27) in the axial direction, thereby making it possible for the aforementioned engagement of the outer link plate (32) of the roller chain (28) with the chain rise rivet (31) on the larger chain wheel (27) to come about. For the functioning of this principle, it is required that the distance, in the chain running direction, between the selection rib (34) and the chain rise rivet (31) corresponds to an odd multiple of the chain pitch. In this way, it is guaranteed that when an inner link plate link (33) is assigned to the selection rib (34), an outer link plate (32) lies against the chain rise rivet (31).

In the example shown, the distance between the selection rib (34) and the chain rise rivet (31) amounts to a single chain pitch (37).

In the exemplary embodiment shown, the selection rib (34) is formed in that material that lies adjacent in the chain running direction is machined away. A selection rib could also be formed by pressing material out, applying material, or riveting a separate element on.

In an alternative case, namely if an outer link plate (32) comes to lie axially next to the selection rib (34), engagement of the roller chain (28) with the chain rise rivet (31) is prevented.

In the exemplary embodiment of the invention shown, the smaller chain wheel (26) has 22 teeth and the larger chain wheel (27) has 34 teeth. An increment of 24 teeth on the smaller chain wheel (26) and 36 teeth on the larger chain wheel (27) has also proven to be practical.

In addition to the smaller chain wheel (26) and the larger chain wheel (27), a smallest chain wheel (40), not shown, can also be present, having an even smaller number of teeth than the smaller chain wheel (26).

The invention claimed is:

1. A shifting assembly for shifting a roller chain having alternating pairs of inner and outer link plates between a plurality of front chain wheels for a bicycle, the shifting assembly comprising:
   a smaller chain wheel;
   a larger chain wheel having a chain rise rivet; and
   a chain derailleur having an outer guide plate and an inner guide plate, the inner guide plate comprising a channel, the channel having an elevation contacting the chain rise rivet when the chain rise rivet on the larger chain wheel starts to engage into the space between a pair of outer link plates of the roller chain when shifting the roller chain from the smaller chain wheel to the adjacent larger chain wheel, viewed in a direction parallel to the axis of rotation of the chain wheels.

2. The shifting assembly of claim 1, wherein the larger chain wheel includes a selection rib and a distance, determined in a direction parallel to the longitudinal expanse of the roller chain, at the time shifting of the roller chain to the adjacent larger chain wheel starts, between the selection rib and the chain rise rivet, corresponds to an odd multiple of the chain pitch.

3. The shifting assembly of claim 2, wherein the distance between the selection rib and the chain rise rivet corresponds to a single chain pitch.

4. The shifting assembly of claim of 3, wherein the selection rib has a width that is smaller than the distance between two outer link plates of the roller chain that are adjacent in the longitudinal direction of the roller chain.

5. The shifting assembly of claim of 2, wherein the selection rib has a width that is smaller than the distance between two outer link plates of the roller chain that are adjacent in the longitudinal direction of the roller chain.

6. The shifting assembly of claim 2, wherein the smaller chain wheel has twenty-two teeth and the larger chain wheel has thirty-four teeth.

7. The shifting assembly of claim 2, wherein the smaller chain wheel has twenty-four teeth and the larger chain wheel has thirty-six teeth.

8. The shifting assembly of claim 2, further comprising a smallest chain wheel smaller than the smaller chain wheel.

9. The shifting assembly of claim 2, wherein the distance between a tooth on the tangential run-off of the chain from the smaller chain wheel, in the state when shifting of the roller chain to the adjacent larger chain wheel starts, on the one hand, and the chain rise rivet, on the other hand, corresponds to a whole-number multiple of the chain pitch.

10. The shifting assembly of claim 2, wherein edges of the channel are determined by the position of the high working run of the roller chain and position of the low working run of the roller chain.

11. The shifting assembly of claim 1, wherein the smaller chain wheel has twenty-two teeth and the larger chain wheel has thirty-four teeth.

12. The shifting assembly of claim 1, wherein the smaller chain wheel has twenty-four teeth and the larger chain wheel has thirty-six teeth.

13. The shifting assembly of claim 1, further comprising a smallest chain wheel smaller than the smaller chain wheel.

14. The shifting assembly of claim 1, wherein the distance between a tooth on the tangential run-off of the chain from the smaller chain wheel, in the state when shifting of the roller chain to the adjacent larger chain wheel starts, on the one hand, and the chain rise rivet, on the other hand, corresponds to a whole-number multiple of the chain pitch.

15. The shifting assembly of claim 1, wherein edges of the channel are determined by the position of the high working run of the roller chain and the position of the low working run of the roller chain.

* * * * *